(12) United States Patent
Iwasawa

(10) Patent No.: US 11,093,592 B2
(45) Date of Patent: Aug. 17, 2021

(54) INFORMATION PROCESSING SYSTEM, INFORMATION PROCESSING DEVICE, AUTHENTICATION METHOD AND RECORDING MEDIUM

(71) Applicant: NEC Corporation, Tokyo (JP)

(72) Inventor: Hiroto Iwasawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 368 days.

(21) Appl. No.: 16/084,022

(22) PCT Filed: Mar. 14, 2017

(86) PCT No.: PCT/JP2017/010217
§ 371 (c)(1),
(2) Date: Sep. 11, 2018

(87) PCT Pub. No.: WO2017/164008
PCT Pub. Date: Sep. 28, 2017

(65) Prior Publication Data
US 2020/0296092 A1    Sep. 17, 2020

(30) Foreign Application Priority Data
Mar. 23, 2016    (JP) .............................. JP2016-058275

(51) Int. Cl.
*G06F 21/31*       (2013.01)
*H04L 29/06*       (2006.01)
(Continued)

(52) U.S. Cl.
CPC ............ *G06F 21/31* (2013.01); *H04L 63/083* (2013.01); *H04L 63/0861* (2013.01);
(Continued)

(58) Field of Classification Search
CPC ...................................................... G06F 21/31
(Continued)

(56) References Cited

U.S. PATENT DOCUMENTS 6,032,859 A * 3/2000 Muehlberger ......... G06Q 20/04
235/379
2002/0194140 A1* 12/2002 Makuck ............. G06Q 20/1235
705/67

(Continued)

FOREIGN PATENT DOCUMENTS

CN    103678979 A    3/2014
EP    2611106 A1    7/2013
(Continued)

OTHER PUBLICATIONS

Extended European Search Report for EP Application No. EP17770051.5 dated Jan. 4, 2019.
(Continued)

*Primary Examiner* — Ondrej C Vostal
(74) *Attorney, Agent, or Firm* — Sughrue Mion, PLLC

(57) ABSTRACT

An information processing system according to the present invention includes: a storage device; and at least one processing device coupled to the storage device, the processing device performing operations, the operations includes: acquiring authentication information; performing authentication processing on the acquired authentication information; and performing log-in processing according to an authentication processing result, wherein the operation further includes: performing log-in processing on an authorized system when authentication processing is successful, and performing log-in processing on a dummy system different from the authorized system when authentication processing is unsuccessful.

17 Claims, 8 Drawing Sheets

(51) Int. Cl.
*H04W 12/065* (2021.01)
*H04W 12/06* (2021.01)
*H04W 12/122* (2021.01)

(52) U.S. Cl.
CPC ......... *H04L 63/102* (2013.01); *H04W 12/065* (2021.01); *H04W 12/068* (2021.01); *H04W 12/122* (2021.01)

(58) Field of Classification Search
USPC .............................................................. 726/4
See application file for complete search history.

(56) References Cited

U.S. PATENT DOCUMENTS

| | | | | | |
|---|---|---|---|---|---|
| 2003/0014636 | A1* | 1/2003 | Ahibrand | ................ | G06F 21/34 |
| | | | | | 713/176 |
| 2003/0074559 | A1* | 4/2003 | Riggs | ...................... | G09B 5/00 |
| | | | | | 713/168 |
| 2003/0229781 | A1* | 12/2003 | Fox | ......................... | H04L 12/18 |
| | | | | | 713/155 |
| 2007/0061455 | A1* | 3/2007 | Callaghan | ............... | H04L 63/08 |
| | | | | | 709/225 |
| 2007/0067811 | A1* | 3/2007 | Tajima | .................... | G06F 21/88 |
| | | | | | 725/81 |
| 2007/0101153 | A1* | 5/2007 | Kawaji | ................. | H04W 12/06 |
| | | | | | 713/185 |
| 2007/0165911 | A1* | 7/2007 | Baentsch | ................. | G07C 9/257 |
| | | | | | 382/115 |
| 2007/0195956 | A1* | 8/2007 | Gavette | ................... | H04L 63/06 |
| | | | | | 380/277 |
| 2009/0106826 | A1* | 4/2009 | Palestrant | ............. | H04L 9/3213 |
| | | | | | 726/7 |
| 2010/0005509 | A1* | 1/2010 | Peckover | ............ | G06F 21/6254 |
| | | | | | 726/3 |
| 2010/0042850 | A1 | 2/2010 | Niinuma | | |
| 2010/0050268 | A1 | 2/2010 | Sheymov | | |
| 2010/0241595 | A1* | 9/2010 | Felsher | .................. | G06Q 50/24 |
| | | | | | 705/400 |
| 2011/0088084 | A1* | 4/2011 | Yasaki | ................ | G06F 21/6218 |
| | | | | | 726/5 |
| 2011/0302664 | A1* | 12/2011 | Lacroix | ................... | G06F 21/83 |
| | | | | | 726/34 |
| 2012/0185920 | A1* | 7/2012 | Zmener | ................. | H04L 63/101 |
| | | | | | 726/4 |
| 2013/0212658 | A1 | 8/2013 | Amaya Calvo et al. | | |
| 2013/0227676 | A1* | 8/2013 | Guo | ........................ | G06F 21/31 |
| | | | | | 726/18 |
| 2013/0263226 | A1 | 10/2013 | Sudia | | |
| 2014/0007225 | A1* | 1/2014 | Gay | ......................... | G06F 21/40 |
| | | | | | 726/19 |
| 2014/0165175 | A1* | 6/2014 | Sugiyama | ............. | G06F 21/552 |
| | | | | | 726/8 |
| 2014/0351928 | A1 | 11/2014 | McKeeth | | |
| 2015/0350176 | A1* | 12/2015 | Mabuchi | ................. | H04L 67/12 |
| | | | | | 726/6 |
| 2015/0370847 | A1* | 12/2015 | Kondoh | ................... | G06F 17/40 |
| | | | | | 707/691 |
| 2016/0012216 | A1* | 1/2016 | Attfield | ................... | G06F 21/31 |
| | | | | | 726/1 |
| 2016/0048839 | A1* | 2/2016 | Cherry | ............. | G06Q 20/40145 |
| | | | | | 705/44 |
| 2016/0174065 | A1* | 6/2016 | Li | ......................... | H04W 80/00 |
| | | | | | 455/419 |
| 2016/0253486 | A1* | 9/2016 | Sarkar | ................... | G06F 21/316 |
| | | | | | 726/7 |

FOREIGN PATENT DOCUMENTS

| | | |
|---|---|---|
| JP | H04-252350 A | 9/1992 |
| JP | 2010-044594 A | 2/2010 |
| JP | 2011-086026 A | 4/2011 |
| JP | 2013-186851 A | 9/2013 |
| WO | 2008/103778 A2 | 8/2008 |

OTHER PUBLICATIONS

International Search Report of PCT Application No. PCT/JP2017/010217 dated Jun. 13, 2017.

English translation of Written opinion for PCT Application No. PCT/JP2017/010217.

* cited by examiner

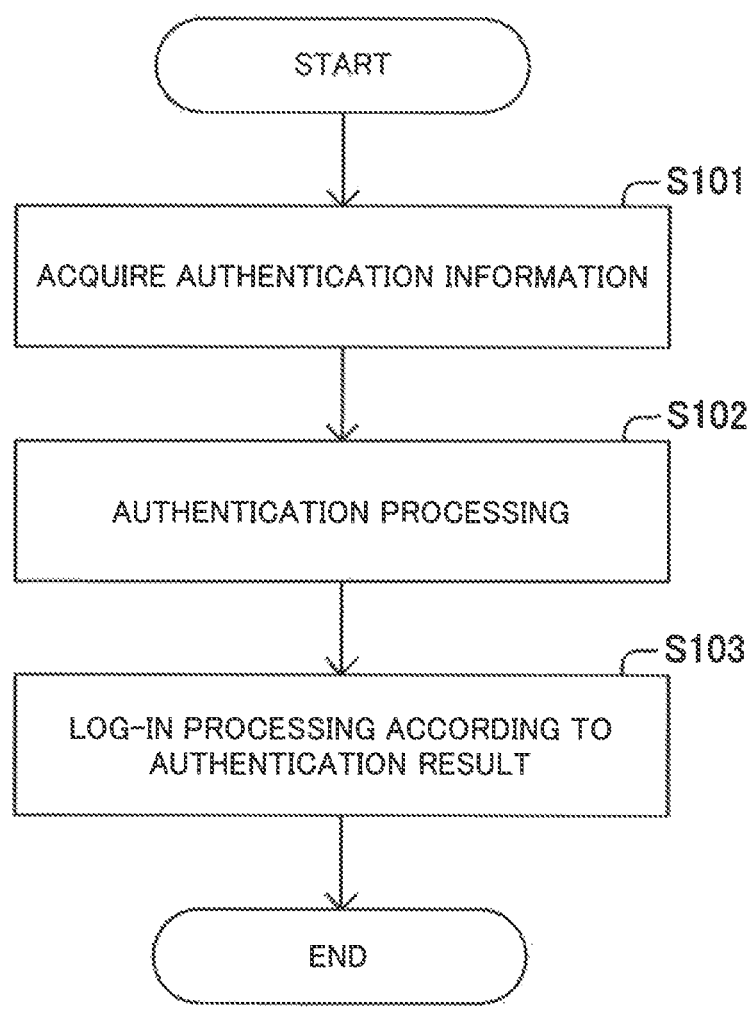

INFORMATION PROCESSING SYSTEM, INFORMATION PROCESSING DEVICE, AUTHENTICATION METHOD AND RECORDING MEDIUM

This application is a National Stage Entry of PCT/JP2017/010217 filed on Mar. 14, 2017, which claims priority from Japanese Patent Application 2016-058275 filed on Mar. 23, 2016, the contents of all of which are incorporated herein by reference, in their entirety.

TECHNICAL FIELD

The present invention relates to an information processing system, and more particularly, to an information processing system that performs authentication processing.

BACKGROUND ART

When a user uses electronic equipment and an information processing system, authentication of the user may be required in terms of maintaining security. For example, in PTL 1, authentication processing is performed by using identification information stored in an integrated circuit (IC) tag and biometric information such as a face image. Then, in PTL 1, even when authentication of the identification information is successful but biometric authentication is unsuccessful, a password is required separately.

CITATION LIST

Patent Literature

[PTL 1] Japanese Unexamined Patent Application Publication No. 2013-186851

SUMMARY OF INVENTION

Technical Problem

In a system in PTL 1, even when authentication of identification information is successful but biometric authentication is unsuccessful, a password is required separately as described above. Thus, when it is assumed that a user performing authentication processing is an unauthorized user, the unauthorized user recognizes that authentication (biometric authentication) different from the authentication of the identification information is performed and is unsuccessful. Then, the unauthorized user takes measures such as a breakthrough and a workaround to the biometric authentication.

A fact that an unauthorized user may take measures such as a breakthrough and a workaround to authentication, is not only limited to the biometric authentication but may occur in every authentication processing. As a result, there is an issue that security of a system that performs authentication processing cannot be improved.

Thus, an object of the present invention is to provide an information processing system capable of solving the above-described issue that security of a system that performs authentication processing cannot be improved.

Solution to Problem

An information processing system according one aspect of the present invention includes:

a storage device; and
at least one processing device coupled to the storage device,
the processing device performing operations, the operations comprising:
acquiring authentication information;
performing authentication processing on the acquired authentication information; and
performing log-in processing according to an authentication processing result, wherein
the operation further includes:
performing log-in processing on an authorized system when authentication processing is successful, and performing log-in processing on a dummy system different from the authorized system when authentication processing is unsuccessful.

An information processing device according to one aspect of the present invention includes:

a storage device; and
at least one processing device coupled to the storage device,
the processing device performing operations, the operations comprising:
performing authentication processing on acquired authentication information; and
performing log-in processing according to an authentication processing result, wherein
the operation further includes:
performing log-in processing on an authorized system when authentication processing is successful, and performing log-in processing on a dummy system different from the authorized system when authentication processing is unsuccessful.

A non-transitory computer-readable recording medium embodying according one aspect of the present invention embodies a program. The program causes an information processing device to perform a method. The method includes:

acquiring authentication information;
performing authentication processing on the acquired authentication information; and
performing log-in processing according to an authentication processing result, wherein
the method further comprises:
performing log-in processing on an authorized system when authentication processing is successful, and performing log-in processing on a dummy system different from the authorized system when authentication processing is unsuccessful.

An authentication method according one aspect of the present invention includes:

acquiring authentication information;
performing authentication processing on the acquired authentication information;
performing log-in processing according to an authentication processing result, wherein
the authentication method further includes:
performing log-in processing on an authorized system when prior authentication processing is successful, and performing log-in processing on a dummy system different from the authorized system when authentication processing is unsuccessful.

Advantageous Effects of Invention

With the configuration as described above, the present invention can improve security of a system that performs authentication processing.

BRIEF DESCRIPTION OF DRAWINGS

FIG. 8 is a flowchart illustrating an authentication method in the example embodiment 2 of the present invention.

EXAMPLE EMBODIMENT

Example Embodiment 1

Figure 1:
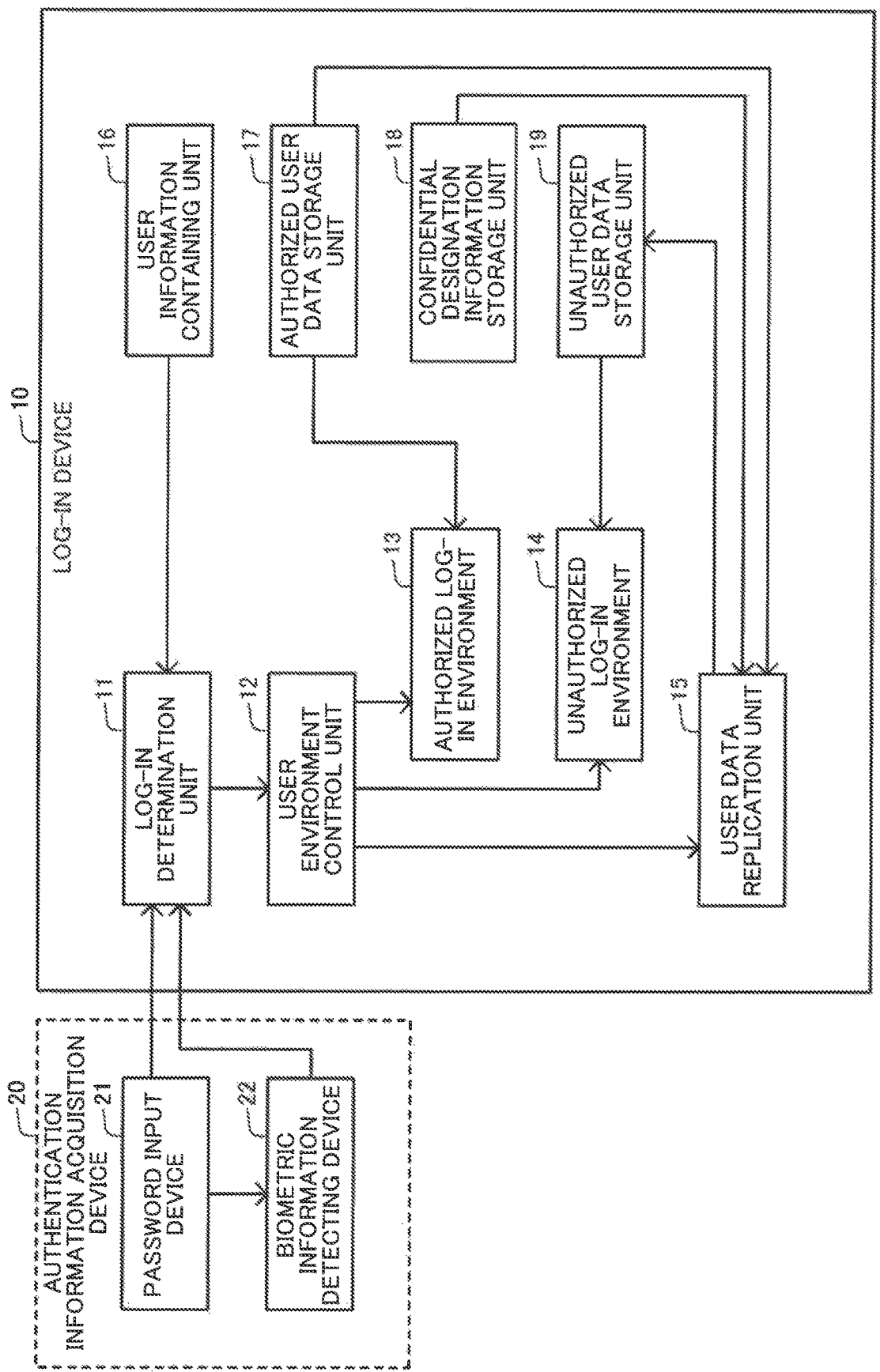
FIG. 1 is a functional block diagram illustrating a configuration of an information processing system according to an example embodiment 1 of the present invention.

A first example embodiment of the present invention will be described with reference to FIGS. 1 to 6. FIG. 1 is a diagram for describing a configuration of an information processing system. FIGS. 2 to 6 are diagrams for describing operations of the information processing system.

[Configuration]

The information processing system in the present example embodiment is configured to receive a log-in request from a user (client), authenticate the log-in, and provide information in the system to the user who logs in. For example, the information processing system is an electronic apparatus and provides information such as personal information stored in the electronic apparatus. Further, the information processing system is a web server and provides information stored in the web server or collected information.

As illustrated in FIG. 1, the information processing system in the present example embodiment includes a log-in device 10 and an authentication information acquisition device 20. The authentication information acquisition device 20 (authentication information acquisition means) is a device that acquires authentication information from a user. The log-in device 10 (information processing device) is an information processing device that performs log-in processing of a user and provides various pieces of information.

The above-described authentication information acquisition device 20 acquires a plurality of different pieces of authentication information from a user. For example, the authentication information acquisition device 20 acquires non-biometric information and biometric information as authentication information. Thus, the authentication information acquisition device 20 in the present example embodiment includes a password input device 21 and a biometric information detecting device 22.

The above-described password input device 21 is, for example, an input device such as a keyboard connected to the log-in device 10, and acquires a password being non-biometric information input by a user operating the input device. Then, the password input device 21 inputs the acquired password to the log-in device 10 connected thereto. Note that, when an input of a password starts, the password input device 21 notifies the biometric information detecting device 22 that the input of the password starts.

Herein, the password input device 21 is not necessarily limited to a keyboard. For example, the password input device 21 may be a card reader, and may read and acquire a password (identification information) stored in an integrated circuit (IC) card and a radio frequency identifier (RFID) card.

The above-described biometric information detecting device 22 is, for example, a camera connected to the log-in device 10, and acquires biometric information such as a face image of a user. Specifically, the biometric information detecting device 22 operates when receiving a notification about a start of an input of a password from the password input device 21 as described above, and acquires biometric information of a user who is inputting the password. In other words, the biometric information detecting device 22 detects biometric information, such as a face image, from the user without being noticed by the user that the biometric information is acquired, regardless of an input operation of the user. Then, the biometric information detecting device 22 inputs the acquired face image to the log-in device 10 connected thereto.

Herein, the biometric information detecting device 22 is not necessarily limited to acquiring a face image and is also not limited to a camera. For example, the biometric information detecting device 22 may acquire, as biometric information, an image of another body part of a user with a camera. Further, for example, the biometric information detecting device 22 may be a fingerprint sensor installed to a keyboard being the password input device 21 described above, and may acquire, as biometric information, a fingerprint of a user touching the keyboard to input a password.

Next, the log-in device 10 will be described. The log-in device 10 is an information processing device including a processing device and a storage device. Then, as illustrated in FIG. 1, the log-in device 10 includes a log-in determination unit 11, a user environment control unit 12, an authorized log-in environment 13, an unauthorized log-in environment 14, and a user data replication unit 15 that are constructed by a program being executed by the installed processing device. Further, the log-in device 10 includes a user information containing unit 16, an authorized user data storage unit 17, a confidential designation information storage unit 18, and an unauthorized user data storage unit 19 that are formed by the installed storage device.

The above-described log-in determination unit 11 (authentication processing means) performs authentication processing on authentication information such as a password and a face image of a user acquired from the above-described authentication information acquisition device 20, and performs log-in determination. Prior to this, the log-in determination unit 11 receives user information for verification to perform authentication processing from the authentication information acquisition device 20 and contains the user information in the user information containing unit 16.

For example, as user registration processing, the log-in determination unit 11 first receives a password input to the password input device 21 and a face image input from the biometric information detecting device 22, and registers them in the user information containing unit 16 in association with identification information about a user. Then, when receiving, as user authentication processing, the password input by the user from the password input device 21 and the face image of the user from the biometric information detecting device 22, the log-in determination unit 11 performs authentication processing whether the password and the face image are registered in the user information containing unit 16. At this time, the log-in determination unit 11 performs the authentication processing on each of the password and the face image. In other words, the log-in determination unit 11 performs each authentication whether the password is registered in the user information containing unit 16 and whether the face image is registered in the user information containing unit 16. Then, the log-in determination unit 11 notifies the user environment control unit 12 of a log-in determination result being an authentication result.

The above-described user environment control unit 12 (log-in processing unit) performs log-in processing on a user who logs in. The user environment control unit 12 particularly controls an environment accessed by the user who logs in according to a log-in determination result by the above-described log-in determination unit 11. Herein, the user environment control unit 12 first determines whether the user who logs in is an authorized user or an unauthorized user from the log-in determination result. For example, when both authentication of a password and a face image is successful, the user environment control unit 12 determines that the user is an authorized user. When authentication of a password is successful and authentication of a face image is unsuccessful, the user environment control unit 12 determines that the user is an unauthorized user.

Then, the user environment control unit 12 performs log-in processing that permits the authorized user to log in to the authorized log-in environment 13 (authorized system), and provides a function and data that can be provided in the authorized log-in environment 13. On the other hand, the user environment control unit 12 performs log-in processing that permits the unauthorized user to log in to the unauthorized log-in environment 14 (dummy system), and provides a function and data that can be provided in the unauthorized log-in environment 14. Note that, when the user environment control unit 12 permits the unauthorized user to log in to the unauthorized log-in environment 14, the user environment control unit 12 instructs the user data replication unit 15 to construct the unauthorized log-in environment 14.

Herein, the authorized log-in environment 13 described above permits access to authorized user data stored in the authorized user data storage unit 17. For example, the authorized user data may be data previously registered by the authorized user or data used by the authorized user. Note that the authorized user data includes confidential data such as personal information that the authorized user does not wish to disclose to a third party.

Further, the authorized log-in environment 13 receives, by an operation of the authorized user who accesses, an input of confidential designation information (designation information) that designates data prohibited from being disclosed to a third party, namely, data to be concealed among authorized user data stored in the authorized user data storage unit 17. Then, the authorized log-in environment 13 registers the received confidential designation information in the confidential designation information storage unit 18 (designation information storage means). The confidential designation information is, for example, information that directly designates data to be concealed and information that designates a condition of data to be concealed. Note that, when the authorized user requests the confidential designation information, the authorized log-in environment 13 provides the confidential designation information stored in the confidential designation information storage unit 18.

Further, the unauthorized log-in environment 14 provided to the unauthorized user as described above is constructed by the user data replication unit 15 according to a command from the user environment control unit 12. The user data replication unit 15 generates unauthorized user data from authorized user data stored in the authorized user data storage unit 17 and confidential designation information stored in the confidential designation information storage unit 18, and stores the unauthorized user data in the unauthorized user data storage unit 19. Specifically, the user data replication unit 15 replicates data excluding data designated in the confidential designation information from the authorized user data, and generates the replicated data as unauthorized user data. Then, after generating the unauthorized user data, the user data replication unit 15 notifies the user environment control unit 12 of generation of the unauthorized user data.

Note that the user data replication unit 15 is not limited to generating unauthorized user data every time an unauthorized log-in by an unauthorized user occurs. When authorized user data changes, the user data replication unit 15 may appropriately update the unauthorized user data by using a difference. In this case, for data subsequently designated as confidential data, the user data replication unit 15 may update the unauthorized user data by receiving updating of confidential designation information from the confidential designation information storage unit 18 and deleting the corresponding confidential data from the existing unauthorized user data.

When receiving a notification that the unauthorized user data is generated from the user data replication unit 15, the above-described user environment control unit 12 provides the unauthorized log-in environment 14 to the unauthorized user as described above. In this way, the unauthorized user can access the unauthorized user data described above that can be accessed from the unauthorized log-in environment 14. In other words, the unauthorized user accesses the dummy unauthorized log-in environment 14 different from the authorized log-in environment 13, and accesses only a part of data excluding data concealed by the authorized user from the authorized user data.

[Operation]

Figure 2:
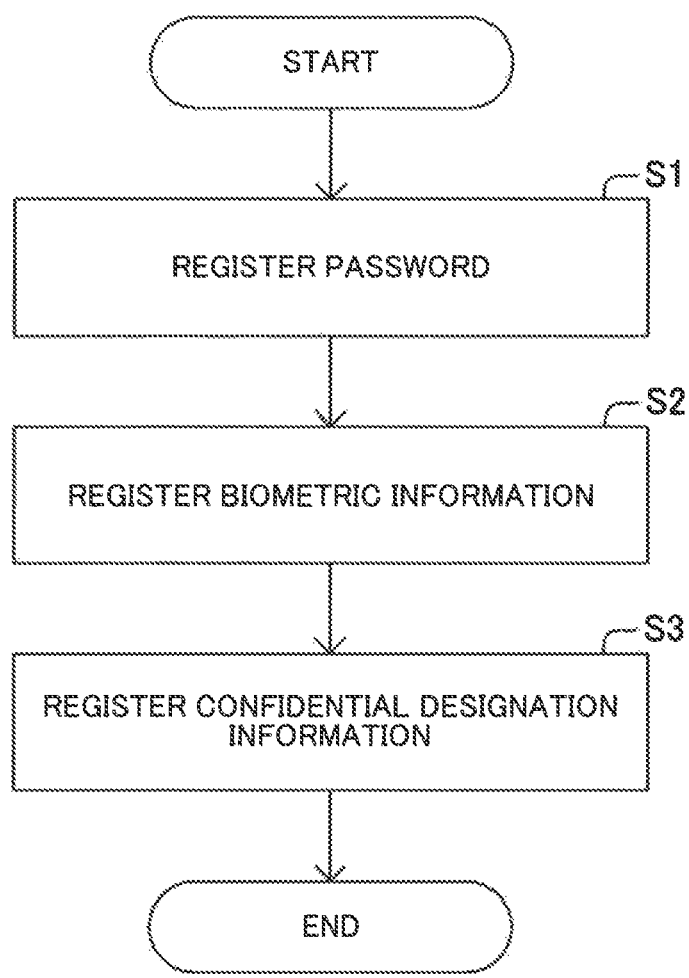
FIG. 2 is a flowchart illustrating operations of user registration processing of the information processing system disclosed in FIG. 1.
Figure 5:
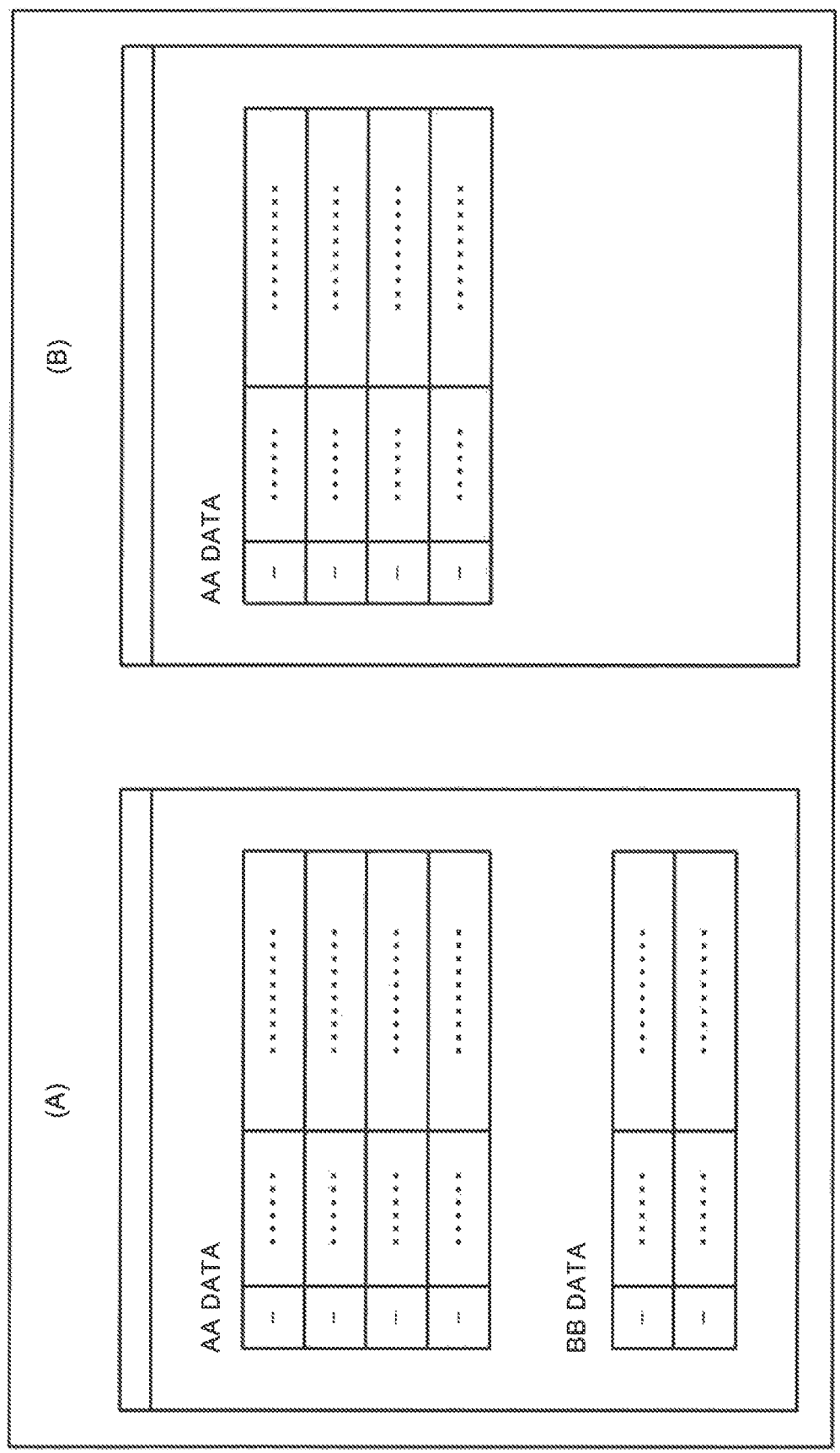
FIG. 5 is a diagram illustrating one example of an output screen of database in a log-in environment provided in the information processing system disclosed in FIG. 1.
Figure 6:
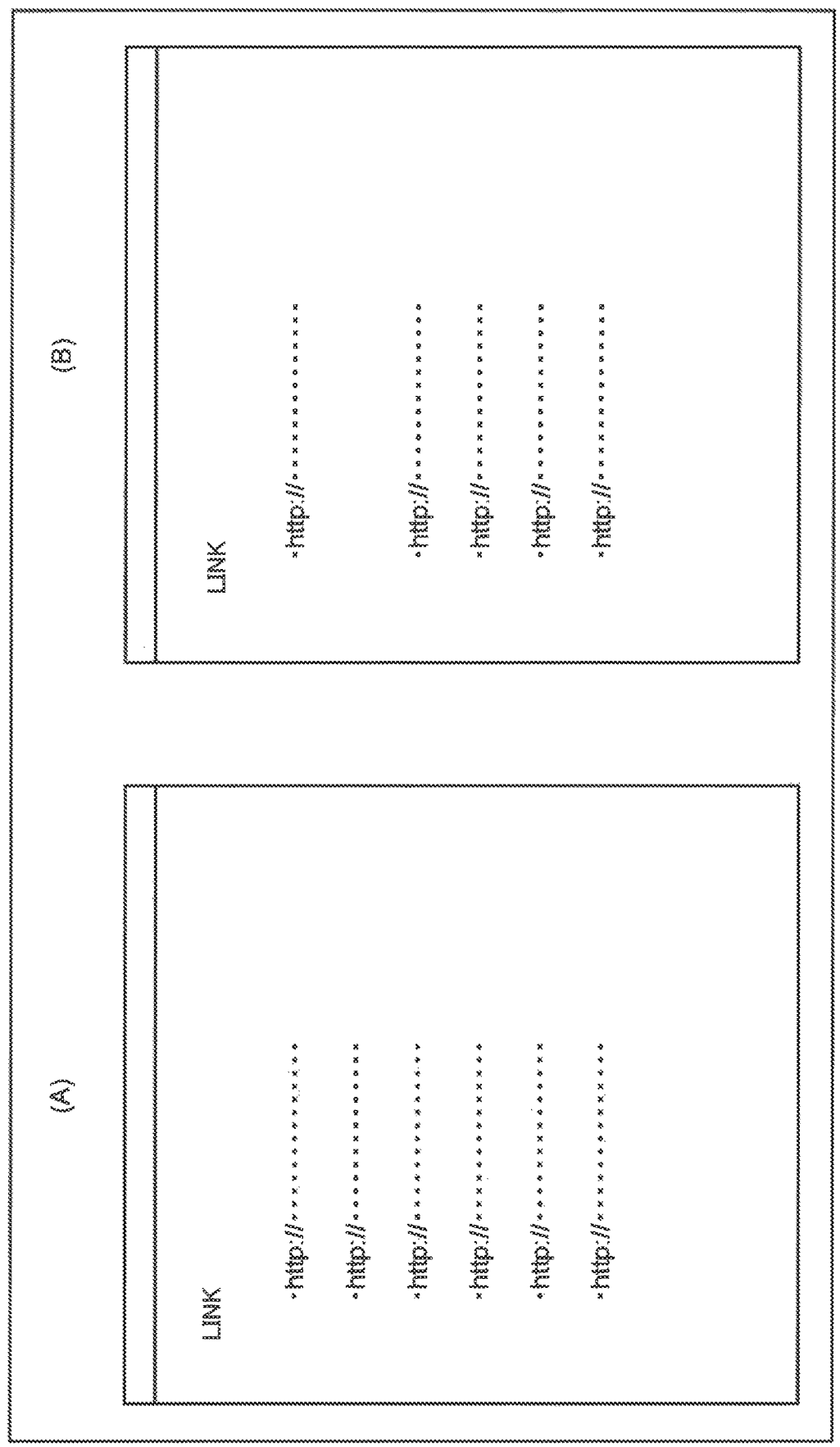
FIG. 6 is a diagram illustrating one example of an output screen of link information in a log-in environment provided in the information processing system disclosed in FIG. 1.

Next, operations of the information processing system described above will be described with reference to flowcharts in FIGS. 2 to 4 and display screens in FIGS. 5 to 6.

First, the user registration processing by an authorized user will be described with reference to FIG. 2. The authorized user inputs a password (non-biometric information) to be registered from the password input device 21. Then, the log-in device 10 associates the input password with user identification information and registers the password in the user information containing unit 16 (Step S1 in FIG. 2). Next, a face image (biometric information) of the authorized user is captured by the biometric information detecting device 22. Then, the log-in device 10 associates the captured face image with the user identification information and registers the face image in the user information containing unit 16 (Step S2 in FIG. 2).

Next, the authorized user inputs confidential designation information that designates data as confidential data from an input device such as the password input device 21. Then, the log-in device 10 registers the input confidential designation information in the confidential designation information storage unit 18 (Step S3 in FIG. 2). In this way, the user registration processing is completed. Note that the authorized user can update the confidential designation information stored in the confidential designation information storage unit 18 after logging in to the authorized log-in environment 13 by log-in processing described later. Further, the authorized user can update authorized user data after logging in to the authorized log-in environment 13 by the log-in processing described later.

Next, the log-in processing by a user will be described with reference to FIGS. 3 to 4. First, the user inputs a password to the password input device 21. When an input of the password starts, the password input device 21 receives the input of the password (non-biometric information) (Step S11 in FIG. 3), and also notifies the biometric information detecting device 22 of input start of the password by the user. The biometric information detecting device 22 that receives the notification captures a face image (biometric information) of the user without being noticed by the user inputting the password. Subsequently, the password input device 21 notifies the log-in determination unit 11 in the log-in device 10 of the input password, and the biometric information detecting device 22 notifies the log-in determination unit 11 in the log-in device 10 of the captured face image.

Figure 3:
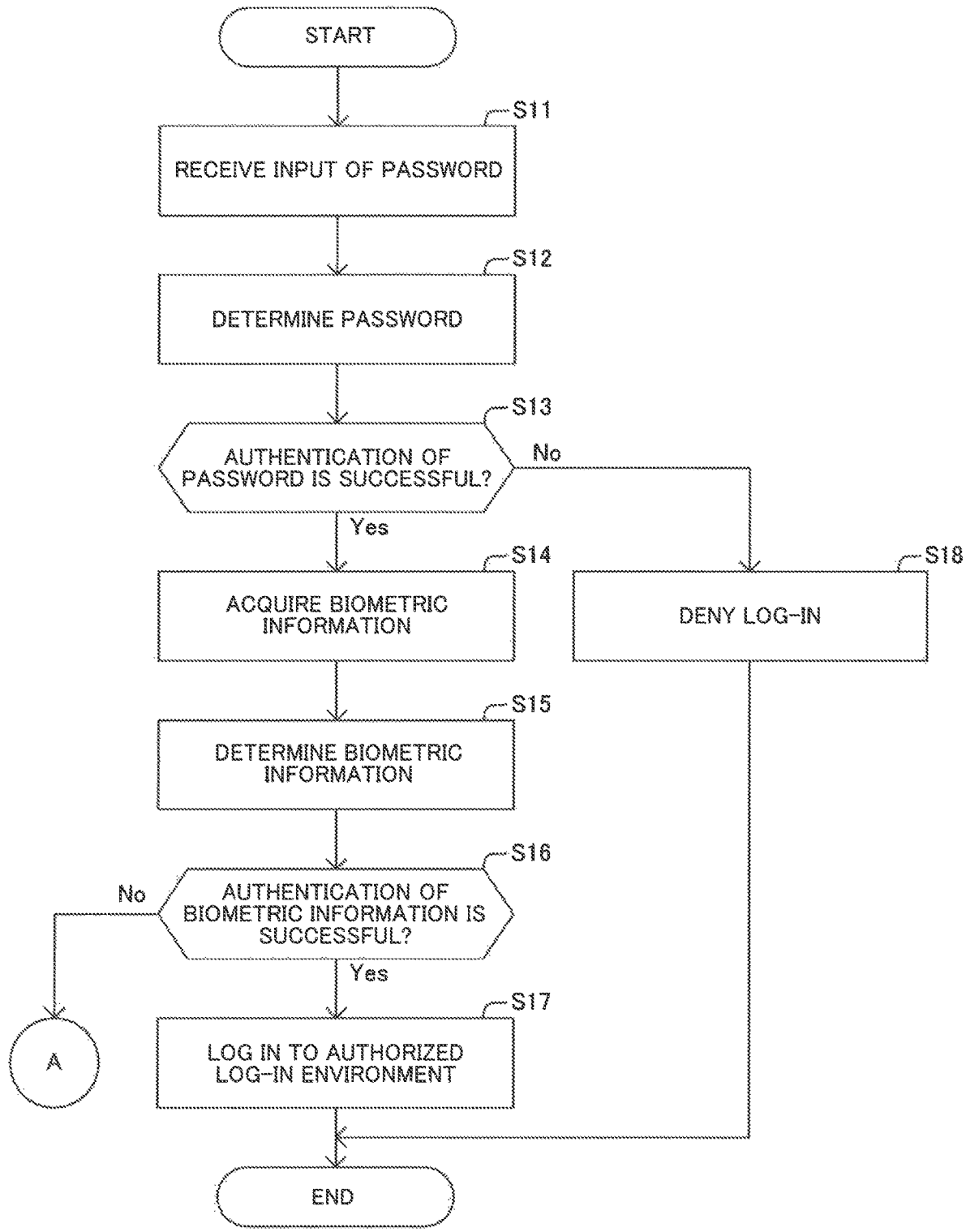
FIG. 3 is a flowchart illustrating operations of login processing of the information processing system disclosed in FIG. 1.

Next, the log-in determination unit 11 compares the notified password with a password registered in the user information containing unit 16, and determines whether or not the input password is correct (Step S12 in FIG. 3). When the input password is a correct password (Yes in Step S13 in FIG. 3), the log-in determination unit 11 acquires the face image input to the biometric information detecting device 22 (Step S14 in FIG. 3). Then, the log-in determination unit 11 compares the input face image with a face image registered in the user information containing unit 16, and determines whether or not the input face image is correct (Step S15 in FIG. 3).

Next, when the face image received from the biometric information detecting device 22 is correct (Yes in Step S16 in FIG. 3), the log-in determination unit 11 determines that the user requesting to log in is an authorized user, and notifies the user environment control unit 12 of information about the authorized user. Then, the user environment control unit 12 permits the authorized user to log in to the authorized log-in environment 13 (Step S17 in FIG. 3), and provides the authorized log-in environment 13 to the authorized user.

In this way, the authorized log-in environment 13 provides all authorized user data stored in the authorized user data storage unit 17 to the authorized user who logs in. Note that the authorized user can register and update, in the confidential designation information storage unit 18, confidential designation information that designates data to be concealed among data generated and/or used by the user included in the authorized user data as necessary.

Next, operations when authentication of a password and a face image is unsuccessful will be described. First, when the password received from the password input device 21 is not a correct password (No in Step S13 in FIG. 3), a log-in of a user is denied, and the processing is terminated (Step S18 in FIG. 3).

On the other hand, when the password is correct (Yes in Step S13 in FIG. 3) but the biometric information received from the biometric information detecting device 22 is not correct (No in Step S16 in FIG. 3 and the processing proceeds to FIG. 4), the log-in determination unit 11 determines that the user requesting to log in is an unauthorized user.

Then, the log-in determination unit 11 notifies the user environment control unit 12 that the log-in is performed by the unauthorized user.

Then, the user environment control unit 12 instructs the user data replication unit 15 to generate unauthorized user data. The user data replication unit 15 that receives the instruction reads authorized user data stored in the authorized user data storage unit 17 and confidential designation information stored in the confidential designation information storage unit 18 (Step S21 in FIG. 4). Then, the user data replication unit 15 generates and replicates unauthorized user data excluding information designated in the confidential designation information from information included in the authorized user data, and stores the unauthorized user data in the unauthorized user data storage unit 19 (Step S22 in FIG. 4). Next, the user data replication unit 15 notifies the user environment control unit 12 that the user data replication unit 15 generates the unauthorized user data.

Figure 4:
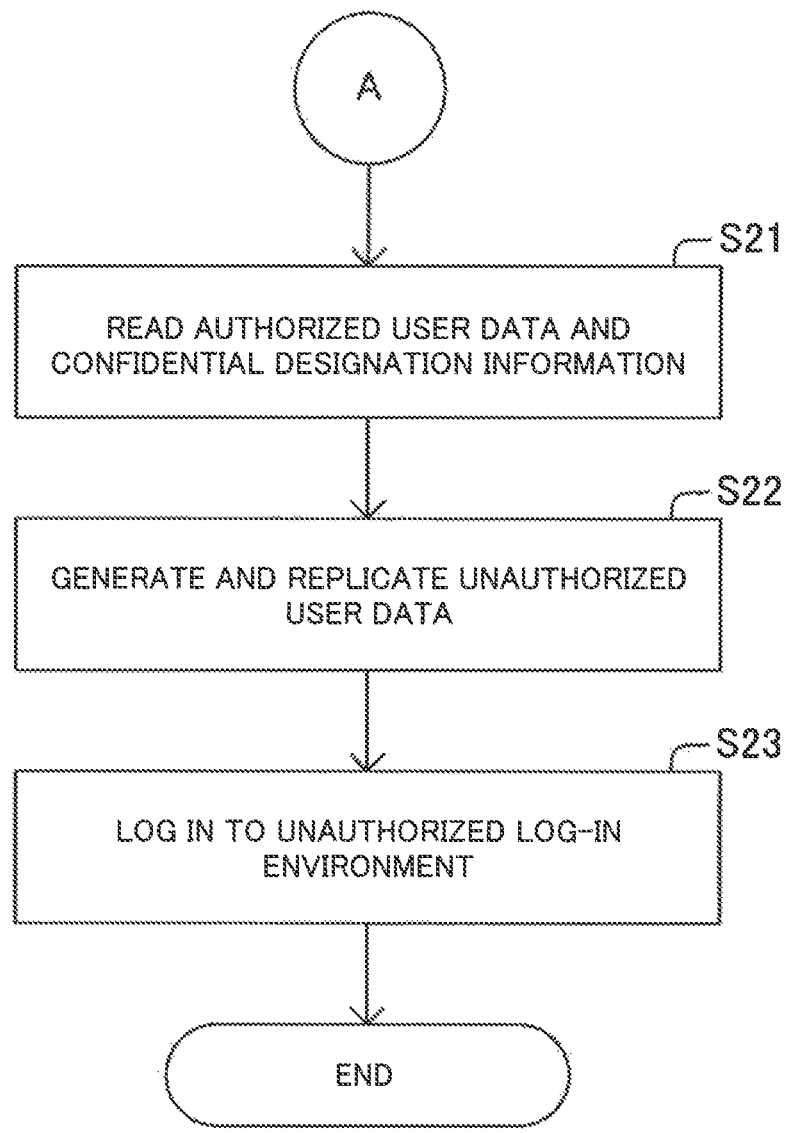
FIG. 4 is a flowchart illustrating operations of login by unauthorized user of the information processing system disclosed in FIG. 1.

The user environment control unit 12 notified that the unauthorized user data is generated from the user data replication unit 15 permits the unauthorized user to log in to the unauthorized log-in environment 14 and provides the unauthorized log-in environment 14 (Step S23 in FIG. 4).

In this way, the unauthorized user can access the unauthorized user data described above that can be accessed from the unauthorized log-in environment 14. In other words, the unauthorized user accesses the dummy unauthorized log-in environment 14 different from the authorized log-in environment 13, and accesses only a part of data excluding data concealed by the authorized user from the authorized user data.

Since the unauthorized user can log in to the unauthorized log-in environment 14 being a dummy environment in such a manner, the unauthorized user determines that the log-in is successful. Thus, an attack such as a future unauthorized log-in can be suppressed and further pursuit of authentication information can be suppressed without the unauthorized user being aware of authentication by biometric information. The unauthorized user data provided to the unauthorized user is particularly a part of data provided in the authorized log-in environment 13, that is, data having a small amount of information excluding data concealed by the authorized user from the authorized user data. Thus, the log-in can appear successful to the unauthorized user while a leakage of information is prevented.

Herein, a specific use example of the information processing system described above will be described with reference to FIGS. 5 to 6. First, a case where the information processing system is a terminal or a server that stores and provides a database will be described. In this case, an authorized user is provided with a database as illustrated in an (A) portion in FIG. 5. However, when the authorized user designates "BB data" as confidential data, an unauthorized user is provided with only "AA data" as illustrated in a (B) portion in FIG. 5.

Next, a case where the information processing system is a web search engine and a system that provides a search result will be described. At this time, it is assumed that an authorized user is a parent and an unauthorized user is a child. Then, it is assumed that filtering information such as "inappropriate website to children" is registered as confidential designation information. In this case, the authorized user (parent) is provided with a search result including links as illustrated in an (A) portion in FIG. 6, but the unauthorized user (child) is provided with a search result in which a part of the link information is deleted as illustrated in a (B) portion in FIG. 6.

In this way, the information processing system of the present invention can conceal data from not only an attacker who performs unauthorized access but also from an inappropriate person depending on a data content when a plurality of people share an apparatus and a system.

For example, it is assumed as a further use example that, when an apparatus cannot be used for some reason such as a user's death, his or her family and the like accesses the apparatus. In this case, when the family logs in to perform a necessary procedure of, for example, suspending an account used by the dead user, user's data that do not want to be seen can be concealed from the family.

Further, the present invention can also be used when some issue occurs in an authorized log-in environment used by an authorized user and another person is requested to check and/or solve the issue in the authorized log-in environment. For example, when confidential data that cannot be disclosed to others is possessed in the authorized log-in environment, the requested person as an unauthorized user accesses an unauthorized log-in environment. In this way, others can solve the issue in the system while the confidential data are concealed.

Example Embodiment 2

Figure 7:
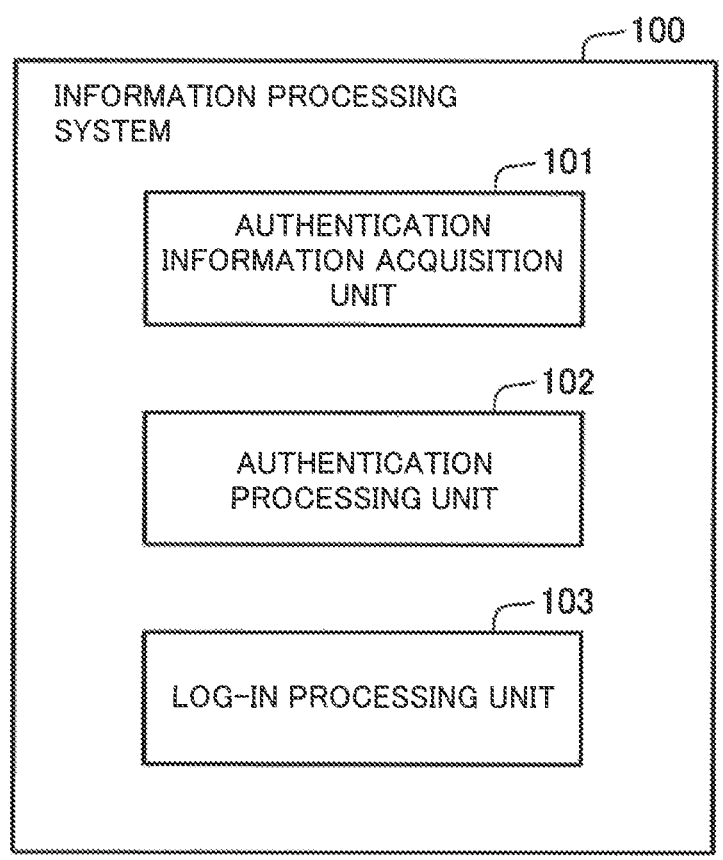
FIG. 7 is a functional block diagram illustrating a configuration of an information processing system according to an example embodiment 2 of the present invention.

Next, a second example embodiment of the present invention will be described with reference to FIGS. 7 to 8. FIG. 7 is a block diagram illustrating a configuration of an information processing system. FIG. 8 is a flowchart illustrating operations of the information processing system.

An information processing system 100 in the present invention includes an authentication information acquisition unit 101 that acquires authentication information, an authentication processing unit 102 that performs authentication processing on the acquired authentication information, and a log-in processing unit 103 that performs log-in processing according to an authentication processing result. Then, the above-described log-in processing unit 103 performs the log-in processing on an authorized system when the authentication processing is successful, and performs the log-in processing on a dummy system different from the authorized system when the authentication processing is unsuccessful.

Note that the above-described authentication information acquisition unit 101 may be installed outside the information processing system. In other words, the information processing system 100 (information processing device) in the present invention may include the above-described authentication processing unit 102 and the above-described log-in processing unit 103. In this case, the above-described authentication processing unit 102 and the above-described log-in processing unit 103 are constructed by a program being executed by a processing device installed in the information processing system 100.

In the information processing system 100 having the above-described configuration, the authentication information acquisition unit 101 first acquires authentication information (Step S101 in FIG. 8). The authentication information acquisition unit 101 acquires, for example, non-biometric information and biometric information as authentication information. Then, the authentication processing unit 102 performs authentication processing on the acquired authentication information (Step S102 in FIG. 8). At this time, when the authentication information is non-biometric information and biometric information, the authentication processing unit 102 performs the authentication processing on each piece of the information.

Then, the authentication processing unit 102 performs log-in processing according to an authentication processing result (Step S103 in FIG. 8). Specifically, the authentication processing unit 102 performs the log-in processing on an authorized system when the authentication processing is successful, and performs the log-in processing on a dummy system different from the authorized system when the authentication processing is unsuccessful. For example, in a case where the authentication information is non-biometric information and biometric information, the authentication processing unit 102 performs the log-in processing on the authorized system when the authentication processing on both pieces of the information is successful, and performs the log-in processing on the dummy system when the log-in processing on the non-biometric information is successful but the log-in processing on the biometric information is unsuccessful.

In this way, in the information processing system, an unauthorized third party logs in to a dummy system even when the authentication processing is unsuccessful, and thus the unauthorized third party who logs in to the dummy system is less likely to notice that the authentication processing is unsuccessful. Thus, an attack on the authentication processing by an unauthorized third party can be suppressed. Further, the dummy system to which an unauthorized third party logs in is different from the authorized system, so that a leakage of information and an unauthorized operation can be suppressed. As a result, security of the system that performs the authentication processing can be improved.

<Supplementary Note>

The whole or part of the exemplary embodiments disclosed above can be described as the following supplementary notes. Hereinafter, an outline of configurations of an information processing system, an information processing device, a program, and an authentication method in the present invention will be described. However, the present invention is not limited to following configurations.

(Supplementary Note 1)

An information processing system includes:

a storage device; and at least one processing device coupled to the storage device, the processing device performing operations, the operations comprising:

acquiring authentication information;

performing authentication processing on the acquired authentication information; and performing log-in processing according to an authentication processing result, wherein the operation further includes:

performing log-in processing on an authorized system when authentication processing is successful, and performing log-in processing on a dummy system different from the authorized system when authentication processing is unsuccessful.

(Supplementary Note 2)

The information processing system according to supplementary note 1, wherein the operation further includes acquiring a plurality of different pieces of the authentication information, performing authentication processing on each of the plurality of acquired pieces of authentication information, performing log-in processing on the authorized system when authentication processing on all the authentication information is successful, and performing log-in processing on the dummy system when authentication processing on at least one piece of the authentication information is unsuccessful.

(Supplementary Note 3)

The information processing system according to supplementary note 1 or 2, wherein the operation further includes acquiring non-biometric information and biometric information as the authentication information, performing authentication processing on each of the acquired non-biometric information and the acquired biometric information, performing log-in processing on the authorized system when authentication processing on each of the non-biometric information and the biometric information is successful, and performing log-in processing on the dummy system when authentication processing on the non-biometric information is successful and authentication processing on the biometric information is unsuccessful.

(Supplementary Note 4)

The information processing system according to supplementary note 3, wherein the operation further includes acquiring the non-biometric information input by an input operation of a user on an input device, and acquiring the biometric information detected from the user regardless of an input operation of the user.

(Supplementary Note 5)

The information processing system according to any one of supplementary notes 1 to 4, wherein the operation further includes performing log-in processing on the dummy system having a smaller amount of accessible information than that of the authorized system when authentication processing is unsuccessful.

(Supplementary Note 6)

The information processing system according to any one of supplementary notes 1 to 5, wherein the operation further includes performing log-in processing on the dummy system in which a part of information of accessible information in the authorized system is accessible when authentication processing is unsuccessful.

(Supplementary Note 7)

The information processing system according to any one of supplementary notes 1 to 6, wherein the operation further includes performing log-in processing on the dummy system in which a part of information of accessible information in the authorized system is replicated and the replicated information is accessible when authentication processing is unsuccessful.

(Supplementary Note 8)

The information processing system according to any one of supplementary notes 1 to 7, wherein, the operation further includes storing designation information that designates a part of information of accessible information in the authorized system, and performing log-in processing on the dummy system in which information excluding information designated in the designation information from accessible information in the authorized system is replicated and the replicated information is accessible when authentication processing is unsuccessful.

(Supplementary Note 8-1)

An information processing device includes:

a storage device; and at least one processing device coupled to the storage device, the processing device performing operations, the operations comprising:

performing authentication processing on acquired authentication information; and performing log-in processing according to an authentication processing result, wherein the operation further includes:

performing log-in processing on an authorized system when authentication processing is successful, and performing log-in processing on a dummy system different from the authorized system when authentication processing is unsuccessful.

(Supplementary Note 8-2)

The information processing device according to supplementary note 8-1, wherein the operation further includes:

performing authentication processing on each of a plurality of acquired pieces of the authentication information, log-in processing on the authorized system when authentication processing on all the authentication information is successful, and performing log-in processing on the dummy system when authentication processing on at least one piece of the authentication information is unsuccessful.

(Supplementary Note 8-3)

The information processing device according to supplementary note 8-1 or 8-2, wherein the operation further includes performing authentication processing on each of non-biometric information and biometric information acquired as the authentication information, performing log-in processing on the authorized system when authentication processing on each of the non-biometric information and the biometric information is successful, and performing log-in processing on the dummy system when authentication processing on the non-biometric information is successful and authentication processing on the biometric information is unsuccessful.

(Supplementary Note 8-4)

The information processing device according to supplementary note 8-3, wherein the operation further includes performing authentication processing on each of the non-biometric information input by an input operation of a user on an input device and the biometric information detected from the user regardless of an input operation of the user.

(Supplementary Note 8-5)

The information processing device according to any one of supplementary notes 8-1 to 8-4, wherein the operation further includes performing log-in processing on the dummy system having a smaller amount of accessible information than that of the authorized system when authentication processing is unsuccessful.

(Supplementary Note 8-6)

The information processing device according to any one of supplementary notes 8-1 to 8-5, wherein the operation further includes performing log-in processing on the dummy system in which a part of information of accessible information in the authorized system is accessible when authentication processing is unsuccessful.

(Supplementary Note 8-7)

The information processing device according to any one of supplementary notes 8-1 to 8-6, wherein the operation further includes performing log-in processing on the dummy system in which a part of information of accessible information in the authorized system is replicated and the replicated information is accessible when authentication processing is unsuccessful.

(Supplementary Note 8-8)

The information processing device according to any one of supplementary notes 8-1 to 8-7, wherein, the operation further includes:

storing designation information that designates a part of information of accessible information in the authorized system, and performing log-in processing on the dummy system in which information excluding information designated in the designation information from accessible information in the authorized system is replicated and the replicated information is accessible when authentication processing is unsuccessful.

(Supplementary Note 9)

A non-transitory computer-readable recording medium embodying a program, the program causing an information processing device to perform a method, the method includes:

acquiring authentication information;

performing authentication processing on the acquired authentication information; and performing log-in processing according to an authentication processing result, wherein the method further includes:

performing log-in processing on an authorized system when authentication processing is successful, and performing log-in processing on a dummy system different from the authorized system when authentication processing is unsuccessful.

(Supplementary Note 10) An authentication method includes:

acquiring authentication information;

performing authentication processing on the acquired authentication information;

performing log-in processing according to an authentication processing result, wherein the authentication method further includes:

performing log-in processing on an authorized system when prior authentication processing is successful, and performing log-in processing on a dummy system different from the authorized system when authentication processing is unsuccessful.

(Supplementary Note 11)

The authentication method according to supplementary note 10, further includes:

acquiring a plurality of different pieces of the authentication information;

performing authentication processing on each of a plurality of acquired pieces of the authentication information;

performing log-in processing on the authorized system when authentication processing on all the authentication information is successful; and performing log-in processing on the dummy system when authentication processing on at least one piece of the authentication information is unsuccessful.

(Supplementary Note 12)

The authentication method according to supplementary note 10 or 11, further includes:

acquiring non-biometric information and biometric information as the authentication information;

performing authentication processing on each of the non-biometric information and the biometric information;

performing log-in processing on the authorized system when authentication processing on each of the non-biometric information and the biometric information is successful; and performing log-in processing on the dummy system when authentication processing on the non-biometric information is successful and authentication processing on the biometric information is unsuccessful.

(Supplementary Note 13)

The authentication method according to supplementary note 12, further includes acquiring the non-biometric information input by an input operation of a user on an input device, and acquiring the biometric information detected from the user regardless of an input operation of the user.

(Supplementary Note 14)

The authentication method according to any one of supplementary notes 10 to 13, further includes performing log-in processing on the dummy system having a smaller amount of accessible information than that of the authorized system when authentication processing is unsuccessful.

(Supplementary Note 15)

The authentication method according to any one of supplementary notes 10 to 14, further includes performing log-in processing on the dummy system in which a part of information of accessible information in the authorized system is accessible when authentication processing is unsuccessful.

(Supplementary Note 16)

The authentication method according to any one of supplementary notes 10 to 15, further includes performing log-in processing on the dummy system in which a part of information of accessible information in the authorized system is replicated and the replicated information is accessible when authentication processing is unsuccessful.

(Supplementary Note 17)

The authentication method according to any one of supplementary notes 10 to 16, further includes performing log-in processing on the dummy system in which information excluding information designated in previously stored designation information from accessible information in the authorized system is replicated and the replicated information is accessible when authentication processing is unsuccessful.

Note that, the above-described program is stored in a storage device or recorded in a computer-readable recording medium. For example, the recording medium is a portable medium such as a flexible disk, an optical disk, a magneto-optical disk, and a semiconductor memory.

While the invention is particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-058275, filed on Mar. 23, 2016, the disclosure of which is incorporated herein in its entirety by reference.

REFERENCE SIGNS LIST

10 Log-in device
11 Log-in determination unit
12 User environment control unit
13 Authorized log-in environment
14 Unauthorized log-in environment 15 User data replication unit
16 User information containing unit
17 Authorized user data storage unit
18 Confidential designation information storage unit
19 Unauthorized user data storage unit
21 Password input device
22 Biometric information detecting device
100 Information processing system
101 Authentication information acquisition unit
102 Authentication processing unit
103 Log-in processing unit

The invention claimed is:

1. An information processing system comprising:
a storage device storing instructions; and
at least one processing device coupled to the storage device and configured to
execute the instructions to:
acquire authentication information;
perform authentication processing on the acquired authentication information;
when authorized user data in an authorized system is changed, update unauthorized user data in a dummy system by using a different of the authorized user data changes, the unauthorized user data in the dummy system begin replicated by a part of data excluding data concealed by an authorized user from the authorized user data; and
perform log-in processing according to an authentication processing result,
wherein the at least one processing device is further configured to execute the instructions to
perform log-in processing on the authorized system when authentication processing is successful; and
perform log-in processing on the dummy system that replicated by the part of data exchanging data concealed by the authorized user when authentication processing is unsuccessful.

2. The information processing system according to claim 1, wherein
the at least one processing device is further configured to execute the instructions to
acquire a plurality of different pieces of the authentication information;
perform authentication processing on each of the plurality of acquired pieces of authentication information;
perform log-in processing on the authorized system when authentication processing on all the authentication information is successful; and
perform log-in processing on the dummy system when authentication processing on at least one piece of the authentication information is unsuccessful.

3. The information processing system according to claim 1, wherein
the at least one processing device is further configured to execute the instructions to
acquire non-biometric information and biometric information as the authentication information;
perform authentication processing on each of the acquired non-biometric information and the acquired biometric information;
perform log-in processing on the authorized system when authentication processing on each of the non-biometric information and the biometric information is successful; and
perform log-in processing on the dummy system when authentication processing on the non-biometric information is successful and authentication processing on the biometric information is unsuccessful.

4. The information processing system according to claim 3, wherein
the at least one processing device is further configured to execute the instructions to
acquire the non-biometric information input by an input operation of a user on an input device, and
acquire the biometric information detected from the user regardless of an input operation of the user.

5. The information processing system according to claim 1, wherein
the at least one processing device is further configured to execute the instructions to
perform log-in processing on the dummy system having a smaller amount of accessible information than that of the authorized system when authentication processing is unsuccessful.

6. The information processing system according to claim 1, wherein
the at least one processing device is further configured to execute the instructions to
perform log-in processing on the dummy system in which a part of information of accessible information in the authorized system is accessible when authentication processing is unsuccessful.

7. The information processing system according to claim 1, wherein
the at least one processing device is further configured to execute the instructions to
perform log-in processing on the dummy system in which a part of information of accessible information in the authorized system is replicated and the replicated information is accessible when authentication processing is unsuccessful.

8. The information processing system according to claim 1, wherein,
the at least one processing device is further configured to execute the instructions to
store designation information that designates a part of information of accessible information in the authorized system; and
perform log-in processing on the dummy system in which information excluding information designated in the designation information from accessible information in the authorized system is replicated and the replicated information is accessible when authentication processing is unsuccessful.

9. A non-transitory computer-readable recording medium that stores a program embodying a program, the program causing an information processing device to execute: perform a method, the method comprising:
acquiring authentication information;
performing authentication processing on acquired the acquired authentication information;
when authorized user data in an authorized system is changed, updating unauthorized user data in a dummy system by using a difference of the authorized user data changed, the unauthorized user data in the dummy system being replicated by a part of data excluding data concealed by an authorized user from the authorized user data; and
performing log-in processing according to an authentication processing result,
wherein the method further comprises:
performing log-in processing on the authorized system when authentication processing is successful; and performing log-in processing on the dummy system that replicated by the part of data excluding data concealed by the authorized user when when authentication processing is unsuccessful.

10. An authentication method comprising:

acquiring authentication information;

performing authentication processing on the acquired authentication information;

when authorized user data in an authorized system is changed, updating unauthorized user data in a dummy system by using a difference of the authorized user data changed, the unauthorized user data in the dummy system being replicated by a part of data excluding data concealed by an authorized user from the authorized user data; and performing log-in processing according to an authentication processing result, wherein the authentication method further comprises:

performing log-in processing on the authorized system when prior authentication processing is successful; and performing log-in processing on a dummy system different from the authorized system when authentication processing is unsuccessful.

11. The authentication method according to claim 10, further comprising:

acquiring a plurality of different pieces of the authentication information;

performing authentication processing on each of a plurality of acquired pieces of the authentication information;

performing log-in processing on the authorized system when authentication processing on all the authentication information is successful; and performing log-in processing on the dummy system when authentication processing on at least one piece of the authentication information is unsuccessful.

12. The authentication method according to claim 10, further comprising:

acquiring non-biometric information and biometric information as the authentication information;

performing authentication processing on each of the non-biometric information and the biometric information;

performing log-in processing on the authorized system when authentication processing on each of the non-biometric information and the biometric information is successful; and performing log-in processing on the dummy system when authentication processing on the non-biometric information is successful and authentication processing on the biometric information is unsuccessful.

13. The authentication method according to claim 12, further comprising acquiring the non-biometric information input by an input operation of a user on an input device, and acquiring the biometric information detected from the user regardless of an input operation of the user.

14. The authentication method according to claim 10, further comprising performing log-in processing on the dummy system having a smaller amount of accessible information than that of the authorized system when authentication processing is unsuccessful.

15. The authentication method according to claim 10, further comprising performing log-in processing on the dummy system in which a part of information of accessible information in the authorized system is accessible when authentication processing is unsuccessful.

16. The authentication method according to claim 10, further comprising performing log-in processing on the dummy system in which a part of information of accessible information in the authorized system is replicated and the replicated information is accessible when authentication processing is unsuccessful.

17. The authentication method according to claim 10, further comprising performing log-in processing on the dummy system in which information excluding information designated in previously stored designation information from accessible information in the authorized system is replicated and the replicated information is accessible when authentication processing is unsuccessful.

* * * * *